United States Patent [19]

Russell

[11] 4,381,240
[45] Apr. 26, 1983

[54] SWIMMING POOL WATER CONDITIONING SYSTEM

[75] Inventor: Thomas V. Russell, Mesa, Ariz.

[73] Assignee: Harry M. Weiss, Scottsdale, Ariz.

[21] Appl. No.: 260,681

[22] Filed: May 5, 1981

[51] Int. Cl.³ ............................................. C02F 1/76
[52] U.S. Cl. ................................ 210/746; 137/101.11;
204/128; 204/278; 210/754; 210/765; 210/143;
210/169; 210/195.1; 210/206; 210/192
[58] Field of Search ................... 137/101.11; 204/128,
204/278; 210/754, 765, 143, 169, 192, 206, 739,
744, 746, 195.1

[56] References Cited

U.S. PATENT DOCUMENTS

| | | |
|---|---|---|
| 3,223,242 | 12/1965 | Murray ............................... 210/169 |
| 3,351,542 | 11/1967 | Oldershaw et al. ................ 210/754 |
| 3,378,479 | 4/1968 | Colvin et al. ........................ 210/169 |
| 4,256,552 | 3/1981 | Sweeney ............................. 210/754 |
| 4,279,712 | 7/1981 | Satoh et al. ......................... 204/128 |

Primary Examiner—Peter A. Hruskoci
Attorney, Agent, or Firm—Harry M. Weiss

[57] ABSTRACT

A swimming pool water conditioning system which incorporates a pump-fed, pool water filtration system; a hydrochloric acid-consuming electrolytic chlorine gas generator; and a manifold system to draw the chlorine gas into the flow through the filtration system, to serve in combination as a device to both safely chlorinate and pH-adjust the water in the swimming pool in a controlled manner, so that bacteria growth and the acid level in the pool can be controlled with a minimum of effort and expense.

2 Claims, 3 Drawing Figures

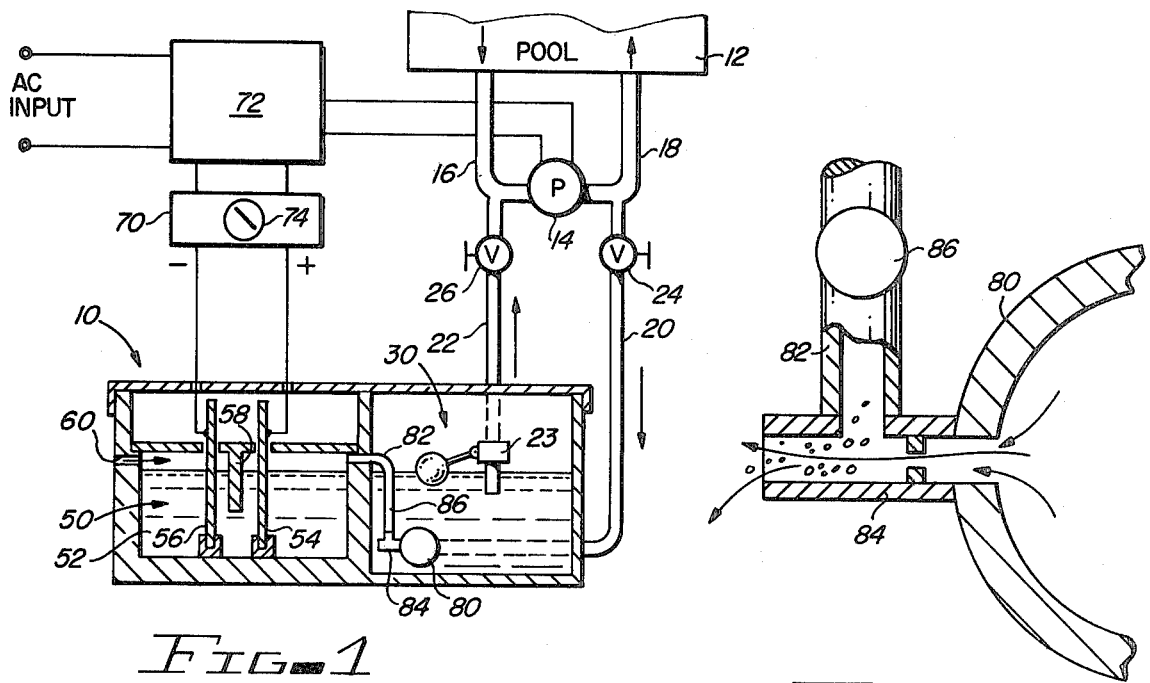
Fig-1
Fig-3
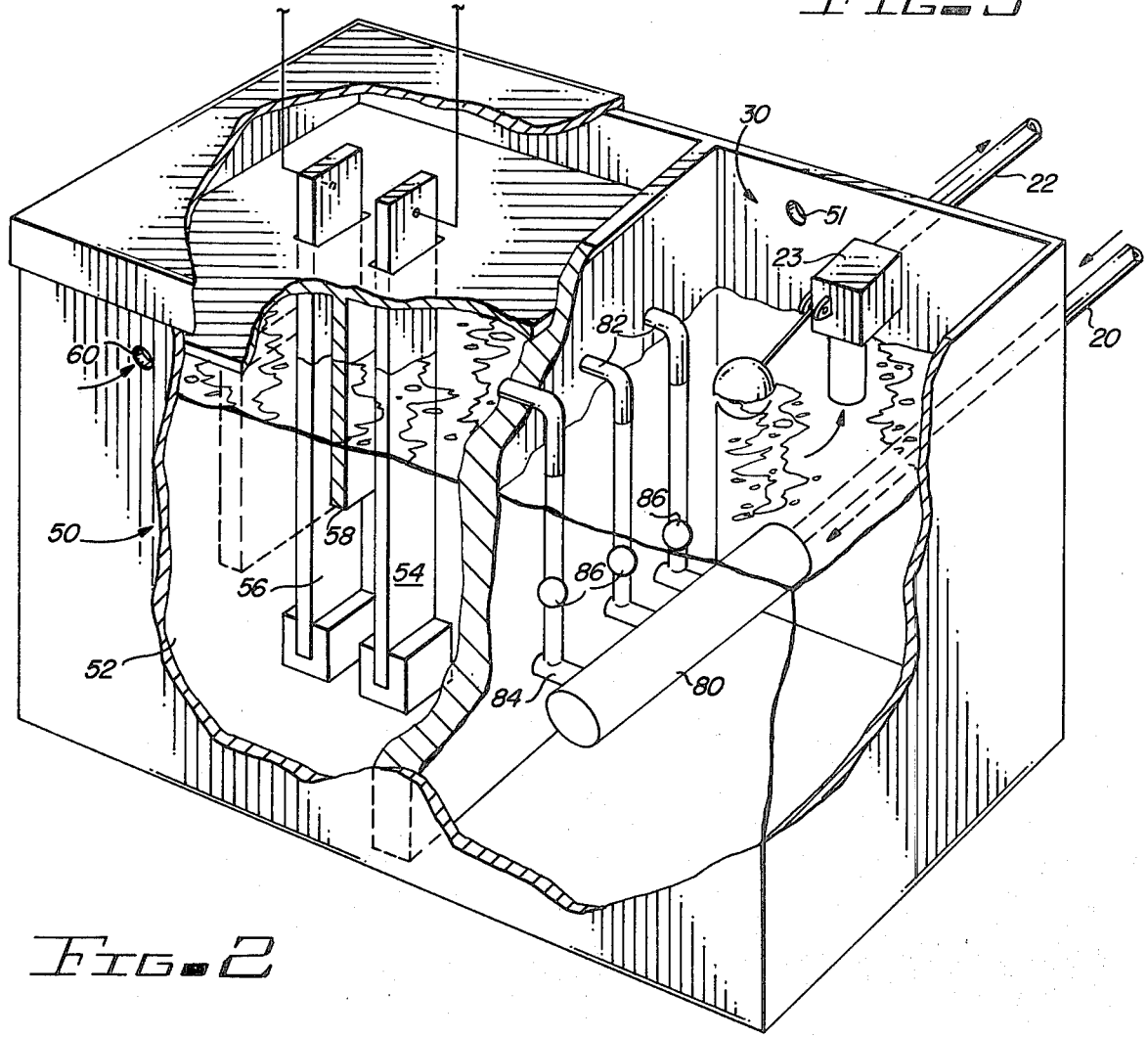
Fig-2

SWIMMING POOL WATER CONDITIONING SYSTEM

BACKGROUND OF THE INVENTION

1. Field of the Invention

This invention relates generally to swimming pool maintenance and, more specifically, to a system for automatically adjusting both the chlorine content and the pH level of the water in a swimming pool. The invention provides a safe system for continually adding small amounts of chlorine gas to the flow of water through the pool filtration system to disinfect the pool, and also to add an acidifying agent to the pool to maintain the pH at a comfortable level.

2. Description of the Prior Art

In the past, controlling the bacteria level and maintaining the chemical balance in a swimming pool have been ongoing problems. Control of bacterial growth in a swimming pool has generally been effected by adding chlorine to the pool water. While large swimming pools justified the installation of a bottled chlorine gas system, which allowed an operator to bleed gaseous chlorine into the pool water as required, the bulk and hardware expense of such a system precluded its use on anything less than a very large pool system.

Smaller swimming pools, including the common backyard-variety pool, typically relied upon the manual addition of chlorine compounds, in the form of pellets or granules, to control bacteria growth. The compounds were added to the pool water to adjust the chlorine content to a level which controlled the bacterial growth in the pool. The chlorine addition was carried out by dropping a fresh supply of chlorine compound directly into the pool water. The chlorine level rose substantially with the addition, causing wide variations in the concentration of the chlorine dissolved in the water and making the precise regulation of the chlorine level difficult, at best. Such an approach to control of bacterial growth was imprecise, due to both the intermittent nature of the addition of a fresh charge of chlorine-releasing compound, and to the substantially uncontrollable rate at which the chlorine compound dissolved. However, it established an effective control over the rate at which bacteria multiplied in the pool, provided that the person maintaining the pool monitor the chlorine level at frequent intervals to detect when chlorine addition was required.

Provision and control of the chlorine level with chlorine tablets or granules had a serious problem, however, in that such prepared chlorine compounds were expensive. It was not unusual to spend from $20.00 to $40.00 in a single month to maintain a safe chlorine level in a small domestic pool, with approximately a 30,000 gallon capacity.

Furthermore, normal use of a swimming pool tended to introduce an alkali content into the pool water. Both body-borne contaminants and solar input, to an outdoor pool, tended to increase the pH of the pool to an unacceptable level. To control the pH level in a pool, acid had to be added. Normally, dilute hydrochloric, or "muriatic", acid was added manually to adjust the pH level. Such a process was inconvenient, time-consuming and also made control of the pH level difficult.

Electrolytic chlorine generators were also known as a source for chlorine gas with which to disinfect a swimming pool. However, such electrolytic gas generators as were used in the past on swimming pools utilized a salt solution as an electrolyte. The salt was expensive, and subsequent to electrolysis left an alkaline residue. The residue was caustic and presented a disposal problem which had to be periodically addressed.

A need existed for an apparatus or method to automatically adjust the chlorine level in a swimming pool to control the growth of bacteria in the pool. A need further existed for a system to chlorinate a swimming pool, which system was reasonable in installation cost and was further low in operating cost. A need existed for a system to automatically adjust the pH level in a swimming pool by adding, on an ongoing basis, an acidifying agent to the pool at a controlled rate.

A need continued to exist for an electrolytic, chlorine gas-conditioning system for a swimming pool which did not require periodic removal of an alkaline residue.

SUMMARY OF THE INVENTION

In accord with a broadest aspect of the invention, it is an object to provide a low-operating cost, automatic chlorinating system for a swimming pool.

In accord with another embodiment of the invention, it is an object to provide an apparatus to automatically feed chlorine gas from an electrolytic generator into the filtration system of a swimming pool.

It is a further object to provide a substantially self-cleaning electrolytic chlorination system for a swimming pool.

It is an object to teach a method for purging an electrolytic swimming pool chlorination system of residual chlorine gas.

It is an object to teach a method for providing a distributed bacteriacidal hypochlorous acid content in a swimming pool by electrolyzing hydrochloric acid.

BRIEF DESCRIPTION OF THE DRAWING

FIG. 1 is a partially sectioned schematic view of a hydrochloric-acid-electrolyzing chlorination system connected into the filtration system of a swimming pool.

FIG. 2 is an enlarged, partially sectioned perspective view of the chlorine gas generating and dissolving unit of the chlorination system of FIG. 1.

FIG. 3 is an enlarged, partially sectioned view of a chlorine gas solvation device of the chlorination system of FIG. 1.

DESCRIPTION OF THE PREFERRED EMBODIMENTS

In accordance with one embodiment of the invention, a swimming pool water conditioning system is disclosed, comprising: filtration means for circulating a flow of pool water through a filter; a tank having enclosed upper and lower volume portions in communication; hydrochloric acid filling the lower portion; electrode means having an anode and a cathode each at least partially immersed in the lower portion for conducting a current through the hydrochloric acid so that at least chlorine gas is freed thereby; and manifold means for conveying the chlorine gas into the flow so that a bacteriacidal solution is formed.

In accord with another embodiment of this invention, a method of safely conditioning water in a swimming pool is disclosed, comprising the steps of: circulating pool water through a filtration system; electrolyzing dilute hydrochloric acid in response to the circulation; collecting chlorine gas generated by the electrolysis;

and siphoning the chlorine gas into the flow so that the pool water is thereby disinfected and pH adjusted.

The foregoing and other objects, features and advantages of this invention will be apparent from the following, more particular description of the preferred embodiments of the invention as illustrated in the accompanying drawings.

Referring to FIG. 1, a schematic view of a swimming pool conditioning system is shown generally by reference number 10. The conditioning system 10 is installed to treat the water in a swimming pool 12. The conditioning system 10 is connected in parallel with the flow through the pool 12 created by a pump 14. The pump 14 is of a type which conventionally circulates a flow through a filtration system, allowing ready installation of the conditioning system 10 on any pool 12 so equipped. The pump 14 has a vacuum inlet fluidly connected to the pool 12 by a pump inlet line 16, and has a pressure outlet connected to the pool 12 by a return line 18.

The conditioning system 10 taps water from the pump return line 18 through a feed water line 20, and returns the chlorinated water through a conditioned water line 22 to the pump inlet line 16. Valves 24, 26 respectively permit flow capacity adjustments to be effected in the feed-water line 20 and the conditioned water line 22. The conditioned water line 22 has a substantially greater flow capacity than the feed-water line 20. The differing flow capacities, along with a float valve 23, prevent an overflow from chlorination chamber 30. The float valve also prevents air from being drawn into the inlet of the pump 14 through the conditioned water line 22.

The flow which is tapped from the pump return line 18 is fed back around the pump 14 through the chlorination chamber 30. Adjoining the chlorination chamber 30 is gas generation chamber 50. The gas generation chamber 50 is at least partially filled with hydrochloric acid 52. The hydrochloric acid 52 is a commercially available product, which is relatively low in cost, and which constitutes the source of the chlorine which is used to condition and treat the pool water. The preferred concentration for the acid is 31.45% by weight. It has been found that a 12 to 15 gallon supply of the acid is capable of generating a sufficient supply of chlorine gas to condition, for example, a 30,000 gallon pool 12 for about 12 to 14 weeks. After the lapse of time, the substantially neutralized acid is drained and a fresh quantity of the acid 52 is added to the gas generation chamber 50. While heavy pool use would necessitate addition of about a gallon of acid at 2 to 3 week intervals during that 12 to 14 week period, the advantage of such a lengthy period between required service of the unit 10 will be apparent to anyone who has chlorinated a pool 12 by the previously used method of adding chlorine releasing compounds.

Referring also to FIG. 2, an enlarged, partially sectioned view of the chlorine gas generating and dissolving unit of the conditioning system 10 is shown. Carbon electrodes 54, 56, which are respectively an anode and a cathode, are shown each partially immersed in the hydrochloric acid 52 within the gas generation chamber 50.

The gas generation chamber 50 is preferably provided with an internal baffle 58 which, although shown partially removed, is sealed at its upper and lateral edges to the interior surface of the generation chamber 50. The lower edge of the baffle 58 rests substantially below the surface of the hydrochloric acid 52, dividing the generation chamber 50 into a chlorine compartment and a hydrogen compartment. The baffle 58 also separates the anode 54 from the cathode 56. The anode 54 is connected to the positive terminal of a DC power supply, and is the situs for the electrolytic release of both chlorine gas and a minor quantity of oxygen gas. The cathode 56 is connected to the negative terminal of the power supply 70, and is the situs for the electrolytic release of hydrogen gas. The hydrogen gas is generated by the electrolysis of both the dissociated acid and the electrolysis of a small quantity of water. Even where the baffle 58 is not installed to prevent accumulation of a potentially explosive mixture, it has been found that the negative pressure created by the flow of pool water through the conditioning chamber 30, as subsequently explained, sweeps the generated gasses quickly from the surface of the gas generation chamber 50 into solution in the conditioning chamber 30, and thereby avoids the accumulation of a potentially explosive mixture. With baffle 58 in place, the lighter-than-air hydrogen gas readily escapes through a vent 60, while the heavier-than-air chlorine gas tends to reside within the gas generation chamber 50 until drawn into the subsequently described manifold system 80.

The power supply 70 is electrically driven from a common controller 72 along with filtration system pump 14. The controller 72 is provided with a sequencing device, which allows a controlled timing of the cessation of operation of the pump 14 and the power supply 70. An ammeter 74 provides a visual indication of the current flow through the acid 52 in the gas generation tank 50, and, as subsequently explained, also permits the acid concentration to be monitored.

The feed pipe 20 enters a manifold device 80 in the chlorination chamber 30. Also connected to the manifold 80 are a series of gas feed pipes 82, which fluidly connect venturis 84 of the manifold 80 to the gas-filled region above the chlorine compartment of the gas generation chamber 50.

When the gas generation chamber 50 is not provided with the baffle 58, a second vent 51 is provided in the chlorination chamber 30 to permit escape of the hydrogen gas.

Referring also to FIG. 3, an enlarged sectional view of a portion of the manifold 80 is shown, revealing one of the venturis 84. One of the gas feed pipes 82 vents into each of the venturis 84 of the manifold 80. Thus, the flow tapped from the pump return line 18 is accelerated as it passes through the venturi 84, and thereby draws the electrolytically freed chlorine from the gas generation chamber 50 into the flow through the venturi 84. A check valve 86 is preferably provided in each of the gas feed lines 82, to positively protect against a back-flow of pool water from the chlorination chamber 30 into the gas generation chamber through the gas feed lines 82.

In operation, the pump 14 generates a flow through the feed water line 20, and a simultaneous application of voltage to the electrodes 54, 56 initiates the electrolytic decomposition of the combined water and dissociated hydrochloric acid into hydrogen gas, chlorine gas and oxygen gas. The positive hydronium ions are drawn toward the cathode 56, where they combine with electrons to ultimately form hydrogen gas molecules. When the electrodes 54, 56 are separated by the baffle 58, the hydrogen gas escapes through the vent 60. The negative chlorine ions are drawn to the anode 54, where they each relinquish an electron and then combine to form chlorine gas molecules. The continuing electrolytic reaction gradually depletes the acid electrolyte, allowing the ammeter 74 to be observed as an indicator of the necessity for adding additional hydrochloric acid 52.

The acceleration of the water, as it drops from the pump output pressure to essentially atmospheric pressure while passing through the venturis 84, causes a negative pressure, with respect to atmospheric pressure, to occur at the gas feed lines 82. That negative pressure tends to draw a flow of gas from the chlorine generating chamber 50 through the feed lines 82 and into the water flow through the manifold 80.

In a system 10 without the baffle 58, the hydrogen gas is also drawn into the gas feed lines 82, along with air which is free to enter through the vent 60. The hydrogen gas does not dissolve and escapes through vent 51.

As the chlorine gas molecules enter the water flow, they dissolve in the water and dissociate into chlorine ions. The chlorine ions react with water molecules to form a dilute solution of hypochlorous acid and hydrochloric acid and also react with randomly occurring hydroxyl ions to form chloric acid. The combined solution is drawn through the conditioned water line 22 back through the pump 14 and into the pool 12. The hydrogen gas, when present, does not dissolve, and ultimately escapes through the second vent 51.

Even though the quantities of the acids actually resulting from the reaction of the gaseous chlorine are relatively minute, they are sufficient to permit the hypochlorous acid to effectively control the bacteria growth while the hydrochloric acid combats the natural tendency of the pool 12 to increase in alkalinity as a result of use.

When the pool water has been adequately filtered, the pump 14 is turned off. The shut down of the pump 14 is, however, delayed by the controller 72 so that the power supply 70 can be first disengaged, stopping the electrolytic release of chlorine gas, so that the continuation of operation of the pump 14 for a short period purges the chlorine generation chamber 50 of chlorine gas.

While the invention has been particularly described and shown in reference to the preferred embodiments thereof, it will be understood by those skilled in the art that various changes in form and detail and omissions may be made therein without departing from the spirit and scope of the invention.

What is claimed is:

1. In a swimming pool, a water conditioning system, comprising:
   means for circulating a flow of pool water into a first chamber;
   a second chamber adjoining said first chamber and having a vented upper- and enclosed lower- volume portions in communication;
   hydrochloric acid filling said lower volume portion;
   electrode means having an anode and a cathode in said lower volume portion for conducting a current through said hydrochloric acid so that chlorine gas is freed thereby;
   manifold means having a venturi in communication with said upper portion and with said means for circulating for drawing said chlorine gas into said first chamber and mixing said chlorine gas with said pool water; means for terminating the operation of said electrode means; and
   control means for sustaining operation of said means for circulating after terminating operation of said electrode means so that said chlorine gas is purged from said upper volume portion when said system is turned off.

2. A method of safely conditioning water in a swimming pool comprising the steps of:
   circulating a flow of pool water into a first chamber;
   providing a second chamber adjoining said first chamber, said second chamber having vented upper and enclosed lower volume portions in communication;
   filling said lower volume portion with hydrochloric acid;
   conducting a current through said hydrochloric acid by the use of electrode means having an anode and a cathode located in said lower volume portion so that chlorine gas is freed thereby;
   providing manifold means having a venturi in communication with said upper portion and with said pool water circulated into said first chamber for drawing said chlorine gas into said first chamber and mixing said chlorine gas with said pool water;
   terminating the operation of said electrode means; and
   providing control means for sustaining the operation of circulating said flow of pool water after terminating the operation of said electrode means so that said chlorine gas is purged from said upper volume portion.

* * * * *